United States Patent
Kodaka

(10) Patent No.: US 7,729,343 B2
(45) Date of Patent: Jun. 1, 2010

(54) IP PHONE SYSTEM AND IP PHONE TERMINAL REGISTRATION METHOD

(75) Inventor: Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 11/680,033

(22) Filed: Feb. 28, 2007

(65) Prior Publication Data

US 2007/0274308 A1    Nov. 29, 2007

(30) Foreign Application Priority Data

Mar. 28, 2006    (JP) .............................. 2006-086860

(51) Int. Cl.
*H04L 12/66* (2006.01)
(52) U.S. Cl. .................. 370/352; 370/329; 370/331
(58) Field of Classification Search ............... None
See application file for complete search history.

(56) References Cited

U.S. PATENT DOCUMENTS

| | | | | |
|---|---|---|---|---|
| 6,009,103 | A * | 12/1999 | Woundy ..................... | 370/401 |
| 6,618,369 | B1 * | 9/2003 | Huh et al. ................... | 370/352 |
| 6,687,245 | B2 * | 2/2004 | Fangman et al. ............ | 370/356 |
| 6,801,540 | B1 * | 10/2004 | Jeong ......................... | 370/466 |
| 6,862,626 | B1 * | 3/2005 | Ryu ............................ | 709/227 |
| 6,958,992 | B2 * | 10/2005 | Lee et al. .................... | 370/352 |
| 7,068,646 | B2 * | 6/2006 | Fangman et al. ............ | 370/352 |
| 7,298,708 | B2 * | 11/2007 | Nasiri et al. ................ | 370/254 |
| 7,298,732 | B2 * | 11/2007 | Cho ............................ | 370/352 |
| 2002/0131402 | A1 * | 9/2002 | Lee et al. .................... | 370/352 |
| 2002/0141352 | A1 * | 10/2002 | Fangman et al. ............ | 370/254 |
| 2002/0141390 | A1 * | 10/2002 | Fangman et al. ............ | 370/352 |
| 2003/0156579 | A1 * | 8/2003 | Cho ............................ | 370/352 |
| 2004/0042461 | A1 * | 3/2004 | Nasiri et al. ............... | 370/395.5 |
| 2005/0169195 | A1 * | 8/2005 | Luo et al. .................... | 370/254 |
| 2005/0180403 | A1 * | 8/2005 | Haddad et al. .............. | 370/352 |
| 2006/0153171 | A1 * | 7/2006 | Sakai .......................... | 370/352 |
| 2006/0165056 | A1 * | 7/2006 | Komaki ...................... | 370/352 |
| 2007/0274308 | A1 * | 11/2007 | Kodaka ...................... | 370/389 |

FOREIGN PATENT DOCUMENTS

JP    2002-315029    10/2002

* cited by examiner

*Primary Examiner*—Salman Ahmed
*Assistant Examiner*—Faiyazkhan Ghafoerkhan
(74) *Attorney, Agent, or Firm*—Antonelli, Terry, Stout & Kraus, LLP.

(57) ABSTRACT

An IP phone terminal registration method capable of reducing the workload as to telephone terminal setup and excluding working mistakes by achieving automated phone terminal registration is provided. Upon connection of a telephone terminal to IP network, a DHCP device issues a terminal registration request to a main apparatus. The main apparatus performs automated phone number allocation to thereby perform terminal registration processing. The DHCP device sends back to the telephone terminal an item of network information that contains therein IP address of the main apparatus and the phone number thus allocated. The phone terminal sets up the IP address of main apparatus and the phone number as self-terminal information, thereby automating the phone terminal registration.

8 Claims, 6 Drawing Sheets

FIG.5

| ASSIGNED FLAG | EXTENSION NUMBER | IP ADDR | MAC ADDR | CONNECT STATE |
|---|---|---|---|---|
| DONE | 301 | 10.0.0.11 | 00:00:00:00:00:11 | CONNECTED |
| DONE | 302 | 10.0.0.12 | 00:00:00:00:00:12 | NOT CONNECTED |
| NOT YET | 303 | | | |
| NOT YET | 304 | | | |
| NOT YET | 305 | | | |
| . . . . | . . . . | . . . . | . . . . | . . . . |

511 512 513 514 51 515

IP PHONE SYSTEM AND IP PHONE TERMINAL REGISTRATION METHOD

INCORPORATION BY REFERENCE

The present application claims priority from Japanese application JP2006-086860 filed on Mar. 28, 2006, the content of which is hereby incorporated by reference into this application.

BACKGROUND OF THE INVENTION

The present invention relates to Internet Protocol (IP) phone systems, IP phone terminal registration methodology, and devices adaptable for use therein, including but not limited to telephone terminals and main apparatus of an IP phone system.

Recent advances in IP networks such as the Internet and intranets result in development of a variety of new communication schemes via networks. In particular, the advent of IP telephones using voice over IP (VoIP) technologies leads to drastic changes in currently established telephone systems. A typical example of such IP phone systems is an extension telephone system for use in working environments of business entities.

Generally, the extension IP phone system is arranged to include an IP phone system main apparatus which manages telephone terminals involved or "subscribed" therein and performs call-up control for voice communications between these phone terminals. Various types of phone terminals are available, major examples of which are a wired IP phone that is directly linkable to IP network, a telephony software application on a personal computer (PC) with a speaker(s) and a microphone connected thereto, and a radiophone handset connectable via a wireless local area network (LAN) access point.

Upon establishment of such extension IP phone system, it is a must to allocate a unique IP address and extension telephone number to every telephony of the phone terminals involved. Simultaneously, it is also needed to register the setup information of these terminals to the main system controller. With all of these setup contents consolidated together while providing consistent compliance therebetween, the extension IP phone system is expected to offer proper operabilities and functionabilities required.

For the allocation of extension phone numbers, it is required to design, prior to system installation, a detailed numbering plan by taking into consideration multiple base points and the exact number of working staffs. Making this numbering plan is inherently a troublesome and time-consuming work. An exemplary approach to solving this problem is to use a method for automatically allocating extension numbers in deference to setup locations of phone terminals as disclosed, for example, in JP-A-2002-315029.

Regarding the telephone terminal IP address setup also, this must be carried out on a per-terminal basis in the event of system installation. A human work required therefor is also troublesome and consumes time. One thinkable method for reducing complexities in IP address allocation is to employ a specific scheme, known as the dynamic host configuration protocol (DHCP). DHCP is the protocol for assigning network information, such as IP addresses, to IP equipment linked to the IP network. Installing a DHCP device on IP network avoids the need for manual IP address setup operations as far as the telephones concerned are DHCP-supporting phone terminals. This makes it possible reduce a total amount of manual operations needed for setup of such IP telephone terminals.

The DHCP device has an ability to allocate a unique IP address to the individual DHCP-supporting IP equipment that is once linked to the IP network within a predetermined area or zone. Additionally for the DHCP, expanded functions are defined by request-for-comment (RFC) 2131 and RFC 2132 standards. Use of the expanded functions makes it possible to set up in option part various kinds of data indicated by tag numbers and to notify more detailed option data. An example is that an authorized period of service (lease time) is settable to an IP address as allocated by the DHCP device. Another example is that an ability is obtained to send IP addresses of a domain name server (DNS) and default gateway accessible from the terminal side while permitting achievement of automated setup thereof.

Unfortunately, the above-stated prior art approach suffers from the lack of any ability to acquire the IP address of the main apparatus in the event that an IP telephone terminal is newly registered to the IP phone system, although it is possible by DHCP to perform IP address setup and extension number allocation in an automated way. Consequently, it is still required for system maintenance service persons to perform manual telephone terminal setup operations for the individual IP phones. Upon installation of the IP phone system, a need is felt to register a great number of IP phone terminals around the same time. Usually a service person or persons perform manual operations for setup of IP phone terminals on a one-at-a-time basis; however, this approach is less in working efficiency. It has also been required to provide a setup method that is free from operation mistakes.

SUMMARY OF THE INVENTION

The present invention was made in view of the above-noted background, and its object is to provide a technique for automating the procedure for registration of a telephone terminal (s) to an IP phone system while improving the efficiency of terminal setup works and eliminating operation mistakes.

To attain the foregoing object, in accordance with one aspect of this invention, a dynamic host configuration protocol (DHCP) device is provided which operates in a way which follows. In the event that a telephone terminal is connected to IP network, the DHCP device issues a terminal registration request to a main apparatus. The main apparatus allocates thereto a telephone number and then performs terminal registration processing in an automated way. The DHCP device returns a notice of network information to the telephone terminal, which notice contains an IP address of the main apparatus and the telephone number thus allocated. The telephone terminal is responsive to receipt of the main apparatus IP address and the phone number for setting them as its own terminal information. With such an arrangement, telephone terminal registration becomes automatically executable.

More specifically, for example, an IP network system is provided, which includes at least one IP phone terminal, an IP phone system main apparatus for management of the IP phone terminal, and a network information notifying device for performing notice of network information to IP equipment on an IP network. In this system, the IP phone terminal operates to transmit a connection request message to the network information notifying device. This message contains therein a media access control (MAC) address of the IP phone terminal per se and an IP address that is received from the network information notifying device and also an item of terminal information which indicates that the terminal itself is an IP phone terminal. The network information notifying device has a storage unit, in which prestored is an IP address of the IP phone system main apparatus. Upon receipt of the connection request message from the IP phone terminal, it transmits, based on the prestored IP address, a terminal registration request message to the IP phone system main apparatus. This message contains the IP phone terminal's MAC address and IP address. The IP phone system main apparatus has a management table used for management of telephone numbers. The main apparatus sends to the network information notifying device any one of a newly registered phone number and a telephone number that has already been registered in a way corresponding to the MAC address and IP address contained in the terminal registration request message. The network information notifying device also receives a telephone number and then notifies the IP phone terminal of both the telephone number and the IP address of IP phone system main apparatus being stored in the storage unit. This permits a network information processing unit of the IP phone terminal to perform setup processing based on the received phone number and the IP address of the IP phone system main apparatus.

With such the arrangement for enabling the network information processing unit of the IP phone terminal to perform the telephone terminal registration setup processing based on the received phone number and the IP address of IP phone system main apparatus, it becomes possible to automatically assign an appropriate extension telephone number to the IP phone terminal by mere connection of it to the IP network, thereby enabling it to be used as operable telephone equipment. In other words, "plug-and-play" of IP phone terminal is achievable.

In addition, certain kinds of operations for telephone terminal registration which have been manually performed by a system maintenance service person conventionally are no longer required, thereby making it possible to greatly save his or her time and workload need to complete the phone terminal setup required. Thus it is possible to radically eliminate or minimize human errors, such as mistakes in the process of manual setup of extension telephone numbers and/or IP addresses.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing a structure of a management table of the main apparatus.

DETAILED DESCRIPTION OF THE INVENTION

Figure 1:
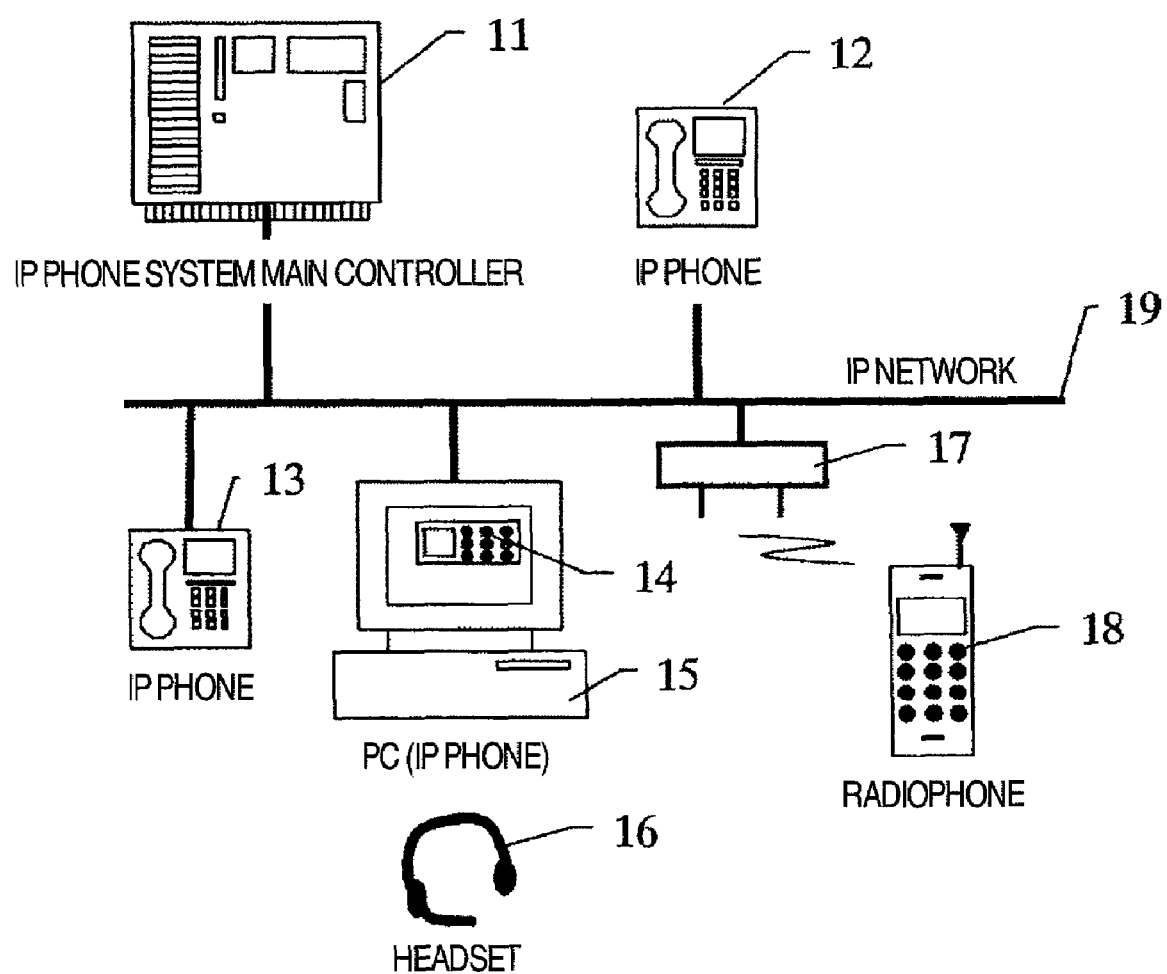
FIG. 1 is a diagram schematically showing a configuration of an extension IP telephone system.

A currently preferred embodiment of this invention will be described in detail with reference to the accompanying figures of the drawing below.

First, a configuration of one typical extension IP telephone system is schematically shown in FIG. 1. As shown herein, this system includes an IP phone system main apparatus 11 which manages telephone terminals 12-14 and 18 and performs call-up control for voice communications between these telephone terminals. The main apparatus 11 will be referred to hereinafter as a main system controller or, simply, main controller. For the phone terminals, there are various types of ones, such as wired or "fixed" IP phones 12-13 which are directly connectable to IP network, a telephony application program 14 operable on a PC—namely, soft-phone—with a headset 16 having speaker and microphone modules connected thereto, a radiophone handset 18 that is linkable over-the-air via a wireless LAN point 17.

Upon establishment of such extension IP phone system, it is required to allocate an IP address and an extension telephone number to the individual one of the telephone terminals 12-14 and 18. It is also needed to register the setup information of these terminals to the main system controller 11 also. Only after all of these setup contents are consolidated together with consistency being retained therebetween, the extension IP phone system is expected to offer proper operabilities and functionabilities required.

Explanation will next be given of an IP phone system in accordance with one embodiment of this invention.

Figure 2:
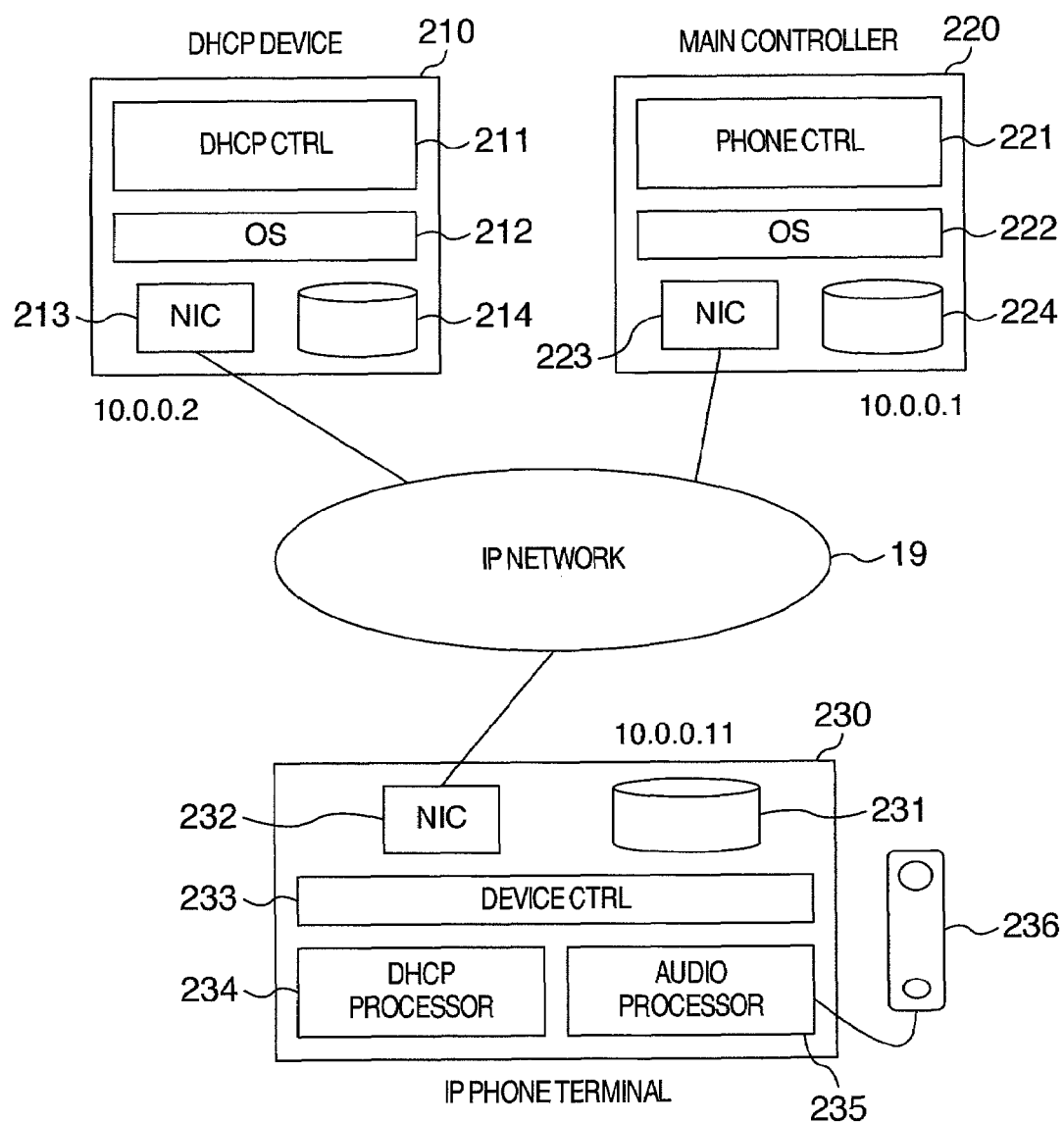
FIG. 2 is a block diagram showing a configuration of an extension IP phone system in accordance with one embodiment of the present invention.

See FIG. 2, which is a block diagram showing a configuration of main part of the extension IP phone system embodying the invention.

As shown in FIG. 2, this system includes a dynamic host DHCP device 210, a main apparatus (i.e., main system controller) 220, and an IP phone terminal 230, which are linkable to an IP network 19. These devices and terminal are added their unique IP addresses respectively—for example, "10.0.0.1", "10.0.0.2", and "10.0.0.11", respectively.

The main controller 220 is generally made up of a telephone control unit 221 which performs telephone terminal registration (i.e., registering terminal setup information as management information) and call-up connection, an operating system (OS) 222 for hardware control, a network interface card (NIC) 223 which is a device for enabling a phone terminal or a PC to the IP network 19, and a storage unit (memory or hard disk drive) 224 for storing therein a present phone terminal registration state and extension telephone numbers. The main controller 220 uses a management table 51 (see FIG. 5) in the storage unit (memory or HDD) 224 to manage extension telephone number information (512) of IP phone terminals 230 under the IP phone system and IP address information (513) to thereby realize calling connection control and voice communication management between telephone terminals.

An exemplary structure of the management table 51 is shown in FIG. 5. As shown herein, the management table 51 is arranged to have in the same record several items of information (e.g., IP and MAC addresses) corresponding to the extension phone number information 512. For example, an IP address "10.0.0.11" and MAC address "00:00:00:00:00:11" are allocated in a way corresponding to an extension phone number "301"; an IP address "10.0.0.12" and MAC address "00:00:00:00:00:12" are assigned corresponding to an extension phone number "302." These extension phone numbers "301" and "302" are already assigned to IP terminals so that each has a flag 511 indicative of allocation completion. In the example of FIG. 5, one of the terminals with its extension number of "301" is presently in connection whereas another terminal of extension number "302" is out of connection. As for those terminals with extension numbers "303" to "305," IP and MAC addresses are not yet allocated thereto.

Turning back to FIG. 2, the IP phone terminal 230 is configured from a storage unit (memory or HDD) 231, a NIC 232, a device control unit 233, a DHCP device 234, an audio/voice processing unit 235 and a handset 236. The storage unit 231 stores the terminal's own telephone number and the IP address of destination main controller 220. The IP phone terminal 230 is IP network-linkable IP equipment with DHCP supportability. The DHCP processor 234 is communicable with DHCP device 210 for receiving various kinds of parameters to be notified from DHCP device 210, such as IP address or else, and for setting the parameters in the storage 231 of self terminal. The IP phone terminal 230 may also be either a wired or "fixed" telephone or a soft-phone on PC.

The DHCP device 210 is configured from a DHCP control unit 211, OS 212 for hardware control, NIC 213, and storage unit (memory or HDD) 214.

The DHCP controller 211 functions to give a unique IP address to the individual one of various types of IP equipment with DHCP supportability, which is then stored for management in the storage 214. It also has DHCP expansion functions and is thus capable of setting several parameters in an option field(s).

In this embodiment, the DHCP device 210 which prestores in its storage unit 214 the IP address "10.0.0.1" of main controller 220 communicates with the main controller 220 to execute the processing for terminal registration of the IP phone terminal 230, and notifies by using known DHCP expanded functions the IP phone terminal 230 of both the IP address "10.0.0.1" of main controller 220 and an extension telephone number "303", and then completes the telephone terminal registration based on this notice. A detailed procedure of this registration processing will be described with reference to FIGS. 3 and 6A-6D below.

Figure 3:
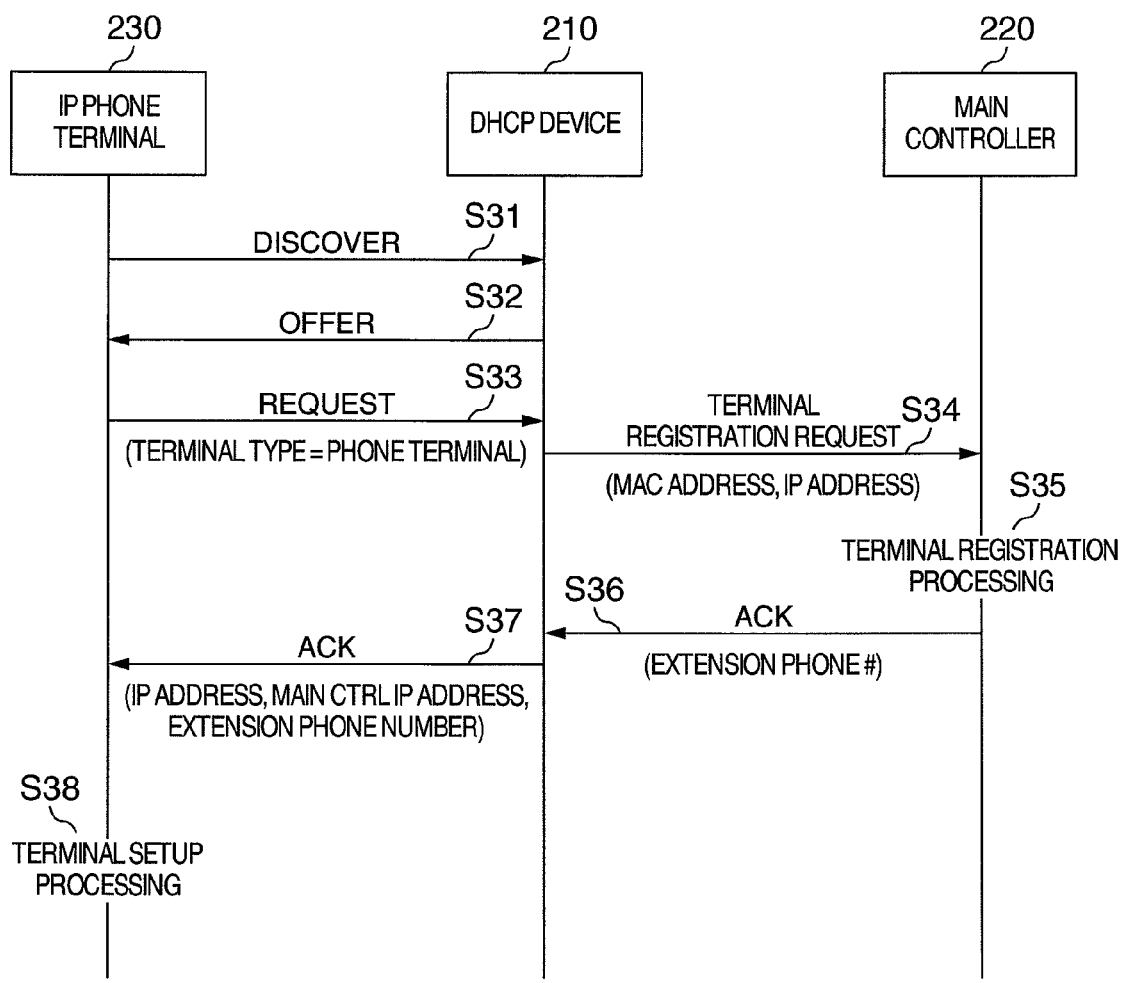
FIG. 3 is a sequence diagram showing message transmission and reception between devices and a terminal in the embodiment of this invention.

FIG. 3 is a flowchart showing a series of processes in the terminal registration processing in the case where messages are transmitted and received or "transceived" among the DHCP device 210 and IP phone terminal 230 plus main controller 220 shown in FIG. 2.

In FIG. 3, a subjective entity that handles the required processing in the DHCP device 210 is the DHCP controller 211. A subjective part in charge of the processing of the IP phone terminal 230 is its DHCP processor whereas principal part handling the processing in the main controller 220 is the telephone controller 221.

A series of message transmit-and-receive (Tx/Rx) processes between the IP phone terminal 230 and the DHCP device 210 is performed using a message configuration as defined by RFC 2131 and RFC 2132, such as shown in FIGS. 6A to 6D.

FIGS. 6A-6D are diagrams each showing the structure of a message to be transmitted and received between the IP phone terminal 230 and DHCP device 210.

Any message being sent and received between the telephone terminal and DHCP device is transmitted in the form of Ethernet™ frame 611 as defined by RFC 2131 and RFC 2132. Ethernet frame consists essentially of a destination MAC address 6111, source MAC address 6112, and a field 612 of IP packet(s). IP packet is made up of a destination IP address 6121, source IP address 6122 and user datagram protocol (USP) packet 613. This UDP packet contains a source port 6131, destination port 6132 and message part 6133a.

Figure 6A:
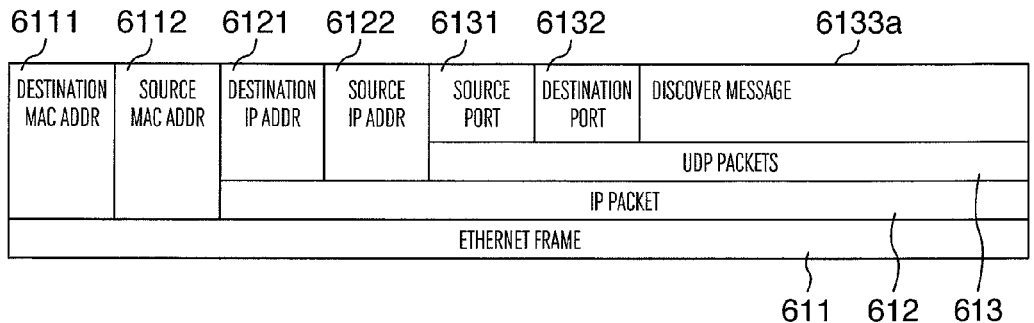
FIGS. 6A to 6D are diagrams each showing an arrangement of DHCP message.

Below is explanation as to a processing procedure of FIG. 3 as a procedure for newly registering an IP phone terminal to the system. Firstly, let the IP phone terminal 230 be newly connected to the IP network 19. In this event, the IP phone terminal 230 detects such connection and then transmits by the function of DHCP processor 234 a DISCOVER message 6133a toward the DHCP device 210 via over-the-air broadcasting at step S31 of FIG. 3. The detection of IP phone terminal connection is enabled by providing a link-up detector in NIC part. The DISCOVER message may be arranged as shown in FIG. 6A.

Figure 6B:
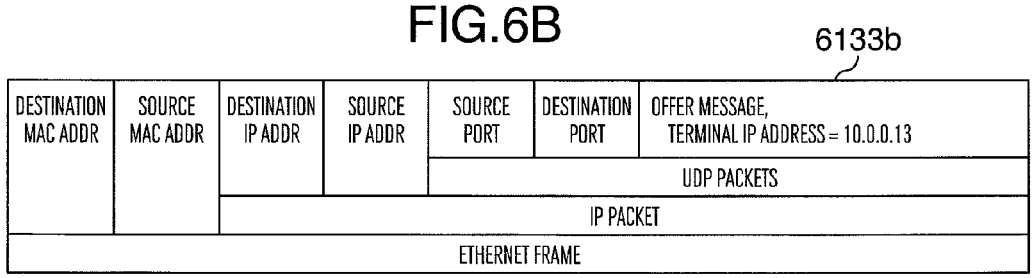

When finding out the DISCOVER message 6133a, the DHCP device 210 sends forth an OFFER message 6133b shown in FIG. 6B toward the IP phone terminal 230 to thereby notify a candidate of terminal IP address—e.g., "10.0.0.13"—at step S32. The notification of this IP address candidate is done by use of the OFFER message 6133b, which contains a message along with the terminal IP address "10.0.0.13" as shown in FIG. 6B.

Upon receipt of this OFFER message, the IP phone terminal 230 acquires the terminal IP address "10.0.0.13" as sent together with the OFFER message.

Figure 6C:
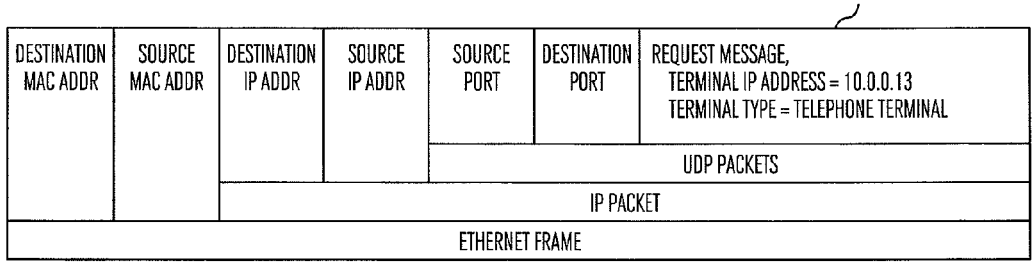

Subsequently at step S33, the IP phone terminal 230 sends a REQUEST message 6133c shown in FIG. 6C, which is a formal or "official" terminal IP address acquisition request. This REQUEST message 6133c requires the previously received IP address "10.0.0.13" as the formal IP address while notifying that the type of terminal is "Telephone Terminal" in this case. An exemplary structure of this REQUEST message is shown in FIG. 6C. As shown in FIG. 6C, REQUEST message 6133c involves the terminal IP address "10.0.0.13" and the terminal type (phone terminal).

Upon receipt of this REQUEST message 6133c, the DHCP device 210 first operates to determine or "judge" the terminal type. In case the terminal type is the telephone terminal, it sends a terminal registration request message to the main controller 220 at step S34 of FIG. 3. This terminal registration request message have parameters as set therein, including an IP address 513 to be allocated to the IP phone terminal 230 and MAC address of IP phone terminal 230 per se. The main controller 220 is responsive to receipt of the terminal registration request, for executing terminal registration processing at step S35 in a way shown in FIG. 4. Regarding the terminal registration processing, this will be described later.

Upon completion of the telephone terminal registration at the main controller 220, it notifies the DHCP device 210 of the finally acquired extension telephone number "303" at step S36.

Figure 6D:
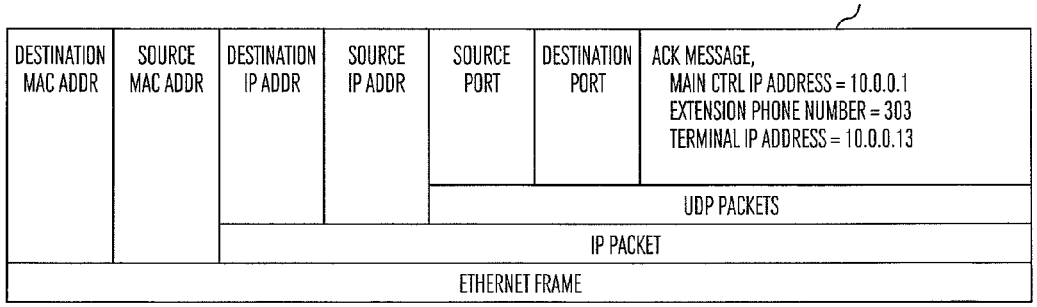

The DHCP device 210 sets up, as option information, the extension telephone number "303" that was received as the terminal-use formal IP address notifying message at step S36 and the IP address "10.0.0.13" of main controller 220 being presently stored in the storage unit 214 and then sends forth an ACK message 6133d toward the IP phone terminal 230 at step S37. This ACK message is constructed as shown in FIG. 6D. ACK message 6133d contains as parameters the main controller IP address "10.0.0.13" and the extension phone number "303" plus the terminal IP address "10.0.0.13".

At the IP phone terminal 230, these parameters received at step S37 are set up in itself at step S38 whereby this terminal goes into the state that it is functionable as a successfully installed telephone with its extension phone number unique thereto.

Figure 4:
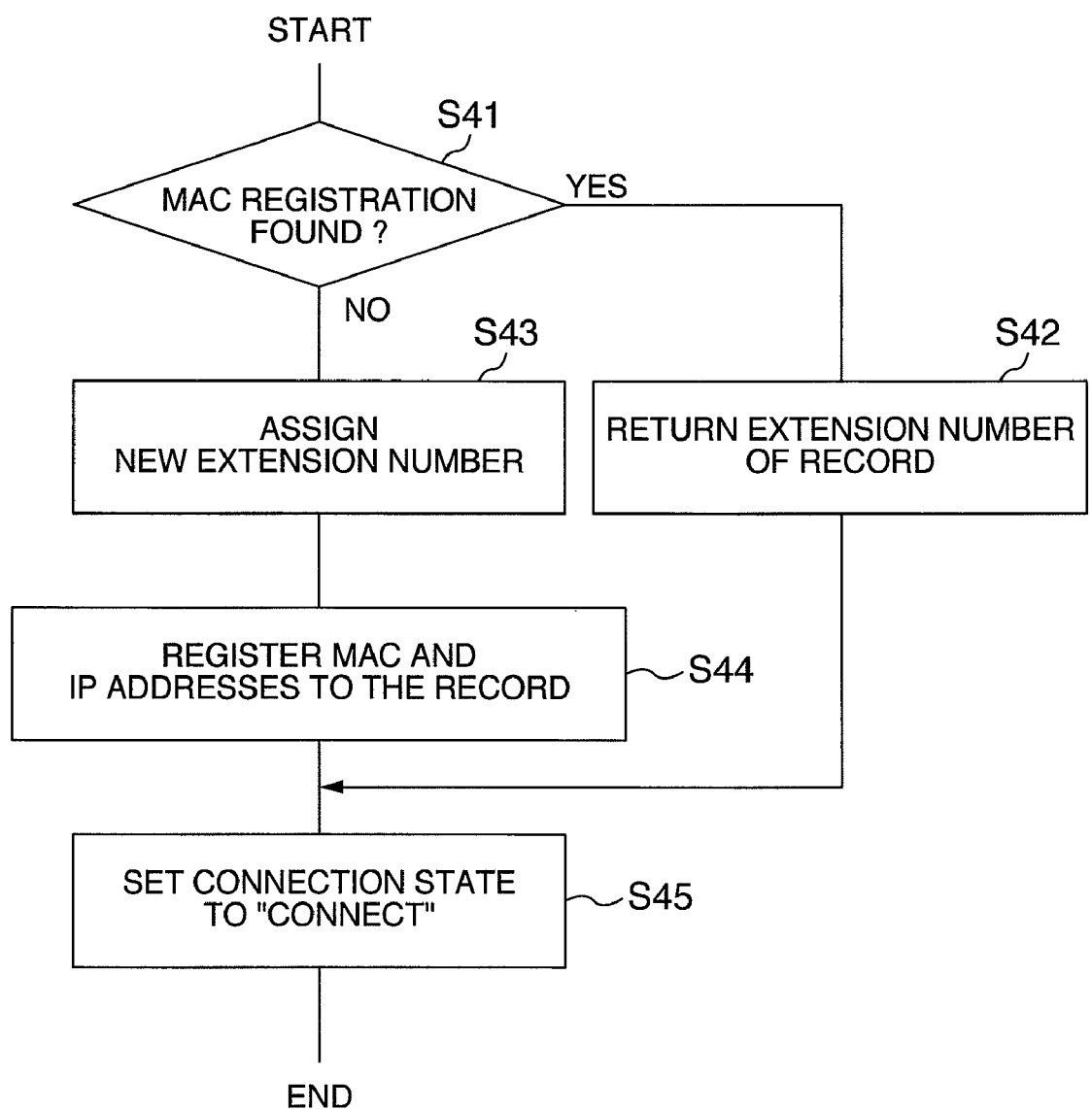
FIG. 4 is a flow diagram of terminal registration processing in a main apparatus.

FIG. 4 is a diagram for explanation of a process flow of the terminal registration processing of the main system controller 220.

As shown in FIG. 4, the system procedure starts with step S41 which causes the telephone control unit 221 of main controller 220 to refer to the contents of MAC address field in the management table 51 of FIG. 5 and then determine whether MAC address is present or absent, which is contained in the terminal registration request message as received at step S34 of FIG. 3. If YES at step S41, i.e., when the MAC address has already been registered, the procedure goes to step S42 which returns an extension phone number of its corresponding record. Alternatively, if NO at step S41, that is, when the MAC address that is contained in the terminal registration request message received at step S34 is not yet registered in the MAC address field of the management table 51, the routine goes to step S43 which allocates thereto a new extension telephone number.

Several approaches are available to allocating such new extension number. An exemplary approach is to conduct at step S43 a search for sequentially finding certain records with an assigned flag of "Not Yet" in the management table 51 and, if such records are found, determines an extension phone number of the first found one to be a new extension number. Then, at step S44, the IP address and MAC address received at step S34 are set to the IP and MAC addresses of this record while at the same time setting the assigned flag of the same record at "Done," which means "completed."

Next, at step S45, let the connection state be set to "Connect." Note here that in view of the fact that the MAC and IP addresses are notified to the main controller 220, it is also possible to adequately set up the extension number in an automated way by use of prior art techniques—for example, the scheme as taught from JP-A-2002-315029 which is cited in the introductory part of this description.

With the processing stated above, the telephone terminal registration of the main system controller 220 is completed successfully.

Although in this embodiment the main controller 220 and the DHCP device 210 are arranged to be separated from each other as shown in FIG. 2, similar operability and functionability are achievable in case these are integrated together and received in the same housing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An IP phone system including at least one IP phone terminal, an IP phone system main apparatus for managing the IP phone, and a network information notifying device for notification of network information to IP equipment on an IP network, wherein the IP phone terminal has a network information processing unit for performing processing of network information to be received from or sent to said network information notifying device, and operates in a new registration event to send to said network information notifying device a connection request message containing therein its own MAC address and an IP address received from said network information notifying device and terminal type information indicating that the terminal is an IP phone terminal, said network information notifying device has a network information control unit for performing management and control of network information to be notified to IP equipment, and a storage unit prestoring therein an IP address of said IP phone system main apparatus, said network information control unit being responsive to receipt of the connection request message from the IP phone terminal for sending, when terminal type information in this message indicates it is a telephone terminal, a terminal registration request message containing the MAC address and IP address of said IP phone terminal and the IP address toward the IP phone system main apparatus based on the IP address being stored in said storage unit, said IP phone system main apparatus has a telephone control unit for performing management and control of said IP phone terminal and a manager unit for managing more than one telephone number while taking correspondence between the MAC address of IP phone terminal and the IP address, said telephone control unit being responsive to receipt of the terminal registration request message for referring to management information of the manager unit, for sending to said network information notifying device a registered telephone number when the telephone number is already registered with correspondence to the MAC address of the IP phone as contained in said terminal registration request message, and for registering a non-assigned new telephone number from the manager unit with correspondence to the MAC address and IP address of the IP phone indicated in said terminal registration request message and for sending to said network information notifying device, the new registered telephone number when the telephone number is not registered with correspondence to the MAC address of the IP phone, the network information control unit of said network information notifying device is responsive to receipt of the telephone number for notifying the newly registered IP phone terminal of this telephone number and the IP address of the IP phone system main apparatus as stored in said storage unit, and the network information processing unit of said IP phone terminal performs setup processing based on the telephone number received and the IP address of the IP phone system main apparatus, wherein the notification of said network information uses dynamic host configuration protocol ("DHCP"), wherein said network information notifying device is a DHCP device, and wherein the notification of terminal type from said IP phone terminal to said DHCP device is sent while being contained in a REQUEST message.

2. An IP phone terminal registration method carried out in an IP phone system including at least one IP phone terminal, an IP phone system main apparatus for managing the IP phone, and a network information notifying device for notification of network information to IP equipment on an IP network, said method comprising:

sending from the IP phone terminal to said network information notifying device, a connection request message containing therein its own MAC address and an IP address received from said network information notifying device and terminal type information indicating that the terminal is an IP phone terminal;

causing said network information notifying device having a storage unit prestoring therein, an IP address of said IP phone system main apparatus to operate, upon receipt of the connection request message from the IP phone terminal, to send to said network information notifying device a registered telephone number when the telephone number is already registered with correspondence to the MAC address of the IP phone contained in said terminal registration request message, and causing said IP phone system main apparatus having a manager unit for managing more than one telephone number while taking correspondence between the IP address and MAC address of the IP phone terminal to operate, upon receipt of the terminal registration request message, to refer to management information of the manager unit and then send to said network information notifying device any one of a telephone number as already registered with correspondence to the MAC address and IP address contained in said terminal registration request message and a newly registered telephone number;

causing said network information notifying device to send forth toward said IP phone terminal, both the telephone number and the IP address of the IP phone system main apparatus being stored in said storage unit; and performing registration of the IP phone terminal by execution of setup processing based on the telephone number received by said IP phone terminal and the IP address of the IP phone system main apparatus, wherein the notification of said network information uses dynamic host configuration protocol ("DHCP"), said network information notifying device is a DHCP device, and the notification of terminal type from said IP phone terminal to said DHCP device is sent while being contained in a REQUEST message.

3. An IP phone terminal registration processing method for use in an IP phone system including at least one IP phone terminal, an IP phone system main apparatus for management of the IP phone and a network information notifying device for performing notice of network information to an IP equipment on IP network, wherein the method is for registration of an IP phone terminal at said network information notifying device and comprises:

causing said network information notifying device to pre-store in a storage unit thereof, an IP address of said IP phone system main apparatus;

receiving from the IP phone terminal a connection request message containing therein its own MAC address and an IP address as received from said network information notifying device and terminal type information indicating that the terminal itself is an IP phone terminal;

when the terminal type information in the connection request message indicates that it is a telephone terminal, sending a terminal registration request message containing the MAC address of said IP phone terminal and the IP address toward the IP phone system main apparatus based on the IP address being stored in said storage unit;

receiving a registered telephone number when the telephone number is already registered while being corresponded by said IP phone system main apparatus to the MAC address of said IP phone terminal;

registering a non-assigned new telephone number in the manager unit with correspondence to the MAC address of said IP phone and the IP address;

receiving newly registered telephone number when the telephone number is not registered with correspondence to the MAC address of said IP phone and the IP address; and notifying said IP phone terminal of this telephone number along with the IP address of the IP phone system main apparatus as stored in said storage unit, wherein the notification of said network information uses dynamic host configuration protocol ("DHCP"), said network information notifying device is a DHCP device, and the notification of terminal type from said IP phone terminal to said DHCP device is sent while being contained in a REQUEST message.

4. An IP phone terminal registration processing method for use in an IP phone system including at least one IP phone terminal, an IP phone system main apparatus for management of the IP phone and a network information notifying device for performing notice of network information to an IP equipment on an IP network, wherein said method is for IP phone terminal registration at said IP phone terminal and comprises:

causing said network information notifying device to pre-store in a first storage unit thereof, an IP address of said IP phone system main apparatus;

causing said IP phone system main apparatus to store in a second storage unit thereof, more than one telephone number while taking correspondence between the MAC address of the IP phone terminal;

causing the IP phone terminal to send to said network information notifying device a connection request message containing its own MAC address and an IP address as received from said network information notifying device and terminal type information indicating that the terminal is an IP phone terminal;

causing said network information notifying device to send the MAC address of said IP phone terminal and the IP address toward the IP phone system main apparatus based on the IP address being prestored in said first storage unit;

causing the IP phone system main apparatus to confirm whether a telephone number is registered in the second storage unit with correspondence between the MAC address of the received IP phone terminal and register a new assigned telephone number, said MAC address and said IP address in the second storage unit when the telephone number is not registered yet;

receiving from said network information notifying device a telephone number registered with correspondence to the MAC address of the IP phone terminal and the IP address and received from said IP phone system main apparatus via said network information notifying device and the IP address of the IP phone system main apparatus being stored in said first storage unit; and performing setup processing of said IP phone terminal based on the received telephone number and the IP address of the IP phone system main apparatus, wherein the notification of said network information uses dynamic host configuration protocol ("DHCP"), said network information notifying device is a DHCP device, and the notification of terminal type from said IP phone terminal to said DHCP device is sent while being contained in a REQUEST message.

5. An IP phone terminal for connection to an IP network, said IP phone terminal including a storage unit for storing therein message information, an interface unit for connection to the IP network, a network setup processing unit having a network setup function for automated allocation of necessary information containing therein an IP address, an audio processing unit, a device control unit for controlling these respective units, and any one of a handset interface unit and a handset as operatively associated with said audio processing unit, wherein when connecting the IP phone terminal to the IP network, message information is sent to and received from a network information notifying device on the network side and a network-side apparatus including an IP phone system main apparatus having telephone terminal registration and calling connection functions, a DISCOVER message and a REQUEST message and a REQUEST message containing therein an terminal IP address and terminal type information are sent from said IP phone terminal to said network-side apparatus, an OFFER message containing said terminal IP address is received in response to the DISCOVER message while receiving, in response to the REQUEST message, an ACK message containing the IP address of said IP phone system main apparatus and said terminal IP address and an extension telephone number corresponding to the IP address, and the IP addresses and the extension telephone number of said ACK message are set to said IP phone terminal, wherein said extension telephone number is a telephone number registered in the IP telephone system main apparatus with correspondence between the MAC address of the IP phone terminal, or a newly assigned telephone number by the IP telephone system main apparatus with correspondence to the MAC address of the IP phone and IP address when no telephone number is registered, wherein the notification of network information uses dynamic host configuration protocol ("DHCP"), wherein said network information notifying device is a DHCP device, and wherein the notification of terminal type from said IP phone terminal to said DHCP device is sent while being contained in a REQUEST message.

6. An IP phone system main apparatus linkable to an IP network for executing calling connection between IP phone terminals of the IP network, said apparatus comprising:

a telephone control unit operative to receive, when an IP phone terminal is connected to said IP network, a message containing a terminal IP address, a terminal MAC address and terminal type information as sent from said IP phone terminal via a network information notifying device, and to respond to receipt of the message for sending toward said IP phone terminal via said network information notifying device a message containing therein an IP address of an IP phone system main apparatus and an extension telephone number and a terminal IP address; and an information registration manager unit for performing registration management while taking correspondence between the IP address and the extension telephone number, wherein the telephone control unit confirms whether a telephone number is registered in the information registration manager unit with correspondence between the MAC address of the IP phone terminal and recodes the telephone number in the information registration manager unit with correspondence between the MAC address and the IP address when registration is done and recodes the newly assigned telephone number with correspondence between the MAC address and the IP address, and sends the newly assigned telephone number to the IP telephone terminal when registration is not done, wherein the notification of network information uses dynamic host configuration protocol ("DHCP"), wherein said network information notifying device is a DHCP device, and wherein the notification of terminal type from said IP phone terminal to said DHCP device is sent while being contained in a REQUEST message.

7. An IP phone system including an IP phone terminal, an IP phone system main apparatus for management of the IP phone terminal, and a network information notifying unit for allocating network information such as an IP address to an IP phone terminal on an IP network and the IP phone system main apparatus, wherein said IP phone terminal has a network information processing unit for performing processing of network information to be sent to and received from said network information notifying device, when connecting said IP phone terminal to the IP network, an IP address formal acquisition message containing terminal type information indicative of a type of said IP phone terminal is sent to said network information notifying device in response to receipt of a message indicative of out-of-connection of IP phone terminal and a message containing therein a candidate IP address of said IP phone terminal of said IP phone system main apparatus, said network information notifying device has a network information control unit for performing management and control of network information to be notified to said IP phone terminal and each equipment of said IP phone system main apparatus and a storage unit prestoring therein an IP address of said IP phone system main apparatus, when said network information control unit receives the IP phone terminal out-of-connection message, the device is responsive to receipt of this message for sending to said IP phone system main apparatus, the message containing the candidate IP address of said IP phone terminal and is responsive to receipt of said IP address formal acquisition message for sending, if the terminal type information in this message is information indicative of an IP phone terminal, a terminal registration request message containing a MAC address of said IP phone terminal and an IP address to said IP phone system main apparatus and also is responsive to receipt of a message containing a telephone number for sending to said IP phone terminal a message containing therein an IP address of said IP phone system main apparatus and IP address and telephone number of said IP phone terminal, said IP phone system main apparatus has a telephone control unit for performing management and control of said IP phone terminal and a manager unit for performing telephone number management while taking correspondence between the MAC address of the IP phone terminal and the IP address, and operates when said phone control unit receives the terminal registration request message to refer to more than one telephone number of the manager unit to thereby send toward said network information notifying device a registered telephone number when the telephone number is already registered with correspondence to the MAC address of the IP phone contained in said terminal registration request message, register a non-assigned new telephone number in the manager unit with correspondence to the MAC address of the IP phone and IP address contained in said terminal registration request message, and send toward said network information notifying device the new registered telephone number while taking correspondence between the MAC address and IP address being contained in said terminal registration request message when the telephone number is not registered with correspondence to the MAC address of the IP phone, and the telephone number received by the network information processing unit of said IP phone terminal and the IP address of the IP phone system main apparatus are set up as IP phone terminal information, wherein said network information notifying device is a dynamic host configuration protocol ("DHCP") device, said connection request message is a DISCOVER message, said message containing the candidate IP address is an OFFER message, said IP address formal acquisition message is a REQUEST message, and the message containing the IP address and the IP address of the IP phone terminal and the telephone number is an ACK message.

8. An IP phone terminal setup method for setting a telephone number and an IP address to an IP phone terminal to be linked to an IP network, said method comprising:

sending, when connecting said IP phone terminal to said IP network, a DISCOVER message to a network information notifying device for notifying said IP phone terminal of network information and for allocating network information such as an IP address;

when said network information notifying device receives said message, responding to this message for sending to said IP phone terminal an OFFER message containing therein a candidate IP address of the IP phone terminal;

when said IP phone terminal receives the OFFER message, sending to said network information notifying device a REQUEST message containing a terminal IP address and an item of terminal type information;

when a network information control unit of said network information notifying device receives the REQUEST message from said IP phone terminal, sending a terminal registration request message containing a MAC address of the IP phone terminal and an IP address toward an IP phone system main apparatus for management of said IP phone terminal based on said IP address;

when a telephone control unit of said IP phone system main apparatus for execution of management and control of said IP phone terminal receives the terminal registration request message, referring to more than one management telephone number for sending to said network information notifying device any one of a registered telephone number when the telephone number is already registered with correspondence to the MAC address of the IP phone contained in said terminal registration request message, and for registering a non-assigned new telephone number in the manager unit with correspondence to the MAC address and IP address of the IP phone contained in said terminal registration request message, and for sending to said network information notifying device the newly registered telephone number when the telephone number is not registered with correspondence to the MAC address of the IP phone;

when the network information control unit of said network information notifying device receives the telephone number, notifying said IP phone terminal of an ACK message containing therein this telephone number and the terminal IP address along with an IP address of said IP phone system main apparatus; and setting as IP phone terminal information, the telephone number and the terminal IP address received by a network information processing unit of said IP phone terminal and the IP address of said IP phone system main apparatus, wherein the notification of said network information uses dynamic host configuration protocol ("DHCP"), wherein said network information notifying device is a DHCP device, and wherein the notification of terminal type from said IP phone terminal to said DHCP device is sent while being contained in a REQUEST message.

\* \* \* \* \*